(12) United States Patent
Alexanderson et al.

(10) Patent No.: US 7,296,915 B2
(45) Date of Patent: ***Nov. 20, 2007

(54) LED LIGHTING DEVICE AND SYSTEM

(76) Inventors: James Kenneth Alexanderson, 734 E. Bethel School Rd., Coppell, TX (US) 75019; Robert C. Harshaw, 4505 Allencrest La., Dallas, TX (US) 75244

( * ) Notice: Subject to any disclaimer, the term of this patent is extended or adjusted under 35 U.S.C. 154(b) by 356 days.

This patent is subject to a terminal disclaimer.

(21) Appl. No.: 11/046,359

(22) Filed: Jan. 28, 2005

(65) Prior Publication Data

US 2005/0135093 A1   Jun. 23, 2005

Related U.S. Application Data

(63) Continuation of application No. 09/951,653, filed on Sep. 13, 2001, now Pat. No. 6,871,981.

(51) Int. Cl.
*F21V 29/00* (2006.01)
*B60Q 3/00* (2006.01)

(52) U.S. Cl. ............... 362/294; 362/373; 362/545; 362/547

(58) Field of Classification Search ............... 362/471, 362/244, 293, 800, 373, 294, 249, 488, 490, 362/545, 547, 345
See application file for complete search history.

(56) References Cited

U.S. PATENT DOCUMENTS 4,733,335 A * 3/1988 Serizawa et al. ........... 362/503
5,038,255 A    8/1991 Nishihashi et al.
5,285,108 A *  2/1994 Hastings et al. ............ 257/712
5,430,627 A    7/1995 Nagano
5,436,809 A    7/1995 Brassier et al.
5,628,557 A    5/1997 Huang
5,632,551 A    5/1997 Roney et al.
5,640,792 A    6/1997 Smith et al.
5,651,636 A    7/1997 Yeh
5,700,080 A   12/1997 Okuda
5,785,418 A    7/1998 Hochstein
5,857,767 A    1/1999 Hochstein
5,927,845 A    7/1999 Gustafson et al.
5,951,150 A    9/1999 Helstern
6,113,248 A    9/2000 Mistopoulos et al.
6,158,882 A   12/2000 Bischoff, Jr.

(Continued)

*Primary Examiner*—Stephen F. Husar
*Assistant Examiner*—Peggy A. Neils
(74) *Attorney, Agent, or Firm*—R. Scott Rhoades; Akin Gump Strauss Hauer & Feld

(57) ABSTRACT

A lighting device and system for illuminating the interior of a vehicle, aircraft or building is provided. The lighting device and system includes a channel case made from a thermally conductive material, including aluminum. The channel case has a bottom edge and two opposed side edges forming an interior space. A circuit board is disposed within the interior space of the channel case and the circuit board includes circuit traces on the top, bottom or both sides of the circuit board. A heat transfer device is attached to the bottom of the circuit board and is further attached to the bottom of the channel case. A plurality of light-emitting diodes and resistors are mounted on the circuit board in series and generate light through a lens which is attached to the two opposed side edges of the channel case.

47 Claims, 6 Drawing Sheets

U.S. PATENT DOCUMENTS

| | | |
|---|---|---|
| 6,161,910 A | 12/2000 | Reisenauer et al. |
| 6,203,180 B1 | 3/2001 | Fleischmann |
| 6,254,262 B1 * | 7/2001 | Crunk et al. ................ 362/544 |
| 6,283,612 B1 | 9/2001 | Hunter |
| 6,340,868 B1 * | 1/2002 | Lys et al. ................ 315/185 S |
| 6,472,823 B2 | 10/2002 | Yen |
| 6,520,666 B1 | 2/2003 | Beyerlein et al. |

* cited by examiner

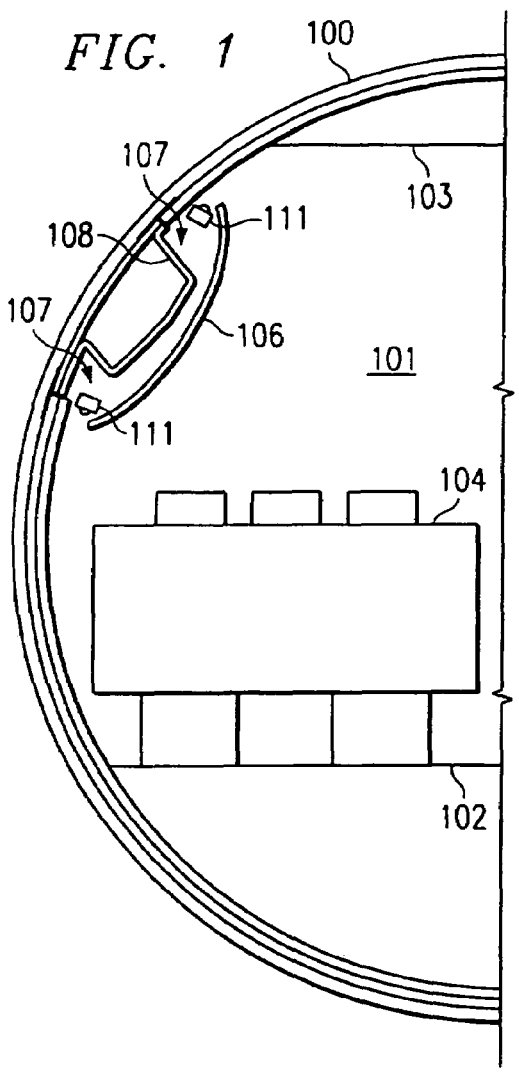
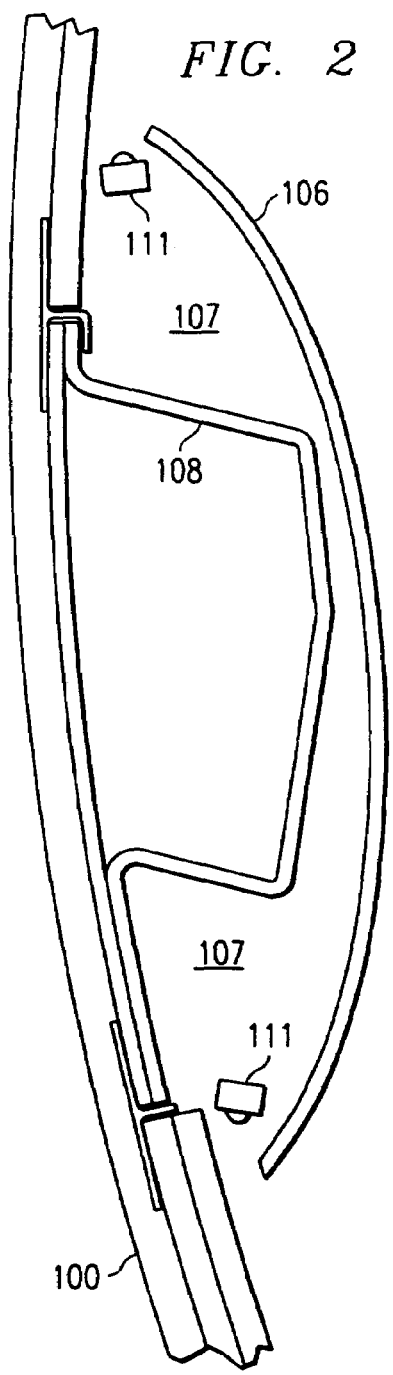

LED LIGHTING DEVICE AND SYSTEM

CROSS-REFERENCE TO RELATED APPLICATIONS

This application is a continuation of U.S. Ser. No. 09/951,653, filed on Sep. 13, 2001 now U.S. Pat. No. 6,871,981, entitled LED LIGHTING DEVICE AND SYSTEM by inventor James Kenneth Alexanderson.

STATEMENT REGARDING FEDERALLY SPONSORED RESEARCH/DEVELOPMENT

Not Applicable

FIELD OF THE INVENTION

The field of the invention relates to an alternative lighting device and system for use in a vehicle, building or aircraft and, more specifically, a lighting device and system for illuminating the interior space of a vehicle, building or aircraft using white light emitting diodes (LEDs).

BACKGROUND OF THE INVENTION

For many years the lighting of the interiors of automobiles, aircraft, trains and other vehicles has been accomplished with the use of flourescent lighting systems. Flourescent lights, otherwise known as cold cathode lights, were widely used in direct or indirect lighting systems. However, flourescent lights possess many characteristics which are disadvantageous to the customer. The disadvantages include the short lifetime of the flourescent lighting tube, high power requirements, low durability, high cost for specialty designs, and high electromagnetic interference which can be detrimental to other electrical systems.

A recent advancement in lighting systems has been made which eliminates many of these disadvantages. The use of light emitting diodes (LEDs) in lighting systems has allowed the customer to avoid many of the disadvantages of using a flourescent lighting system. LED lighting systems are typically low power, have a greatly enhanced lifetime, lower replacement cost and have lower electromagnetic interference. U.S. Pat. No. 6,158,882 entitled "LED Semiconductor Lighting System" discloses one such system. This system uses LEDs in serial for illuminating vehicle interiors. The lighting system includes a plurality of LEDs contained within a sealed lighting tube. However, this system is not directed toward a high power LED lighting system. Namely, this system, which encloses the LEDs in a sealed plastic tube, does not disclose the need for heat dissipation when high power and high heat LEDs are used.

In U.S. Pat. No. 6,203,180 entitled "Airplane Cabin Lighting Arrangement," the disclosed lighting system is mounted in the ceiling of an airplane cabin and includes multiple LEDs connected in parallel or series to a power supply. In this system, the light sources are separated by between 25 and 50 cm. By distributing the LEDs throughout a large space, the high heat caused by high power LEDs is reduced. However, this system does not address dissipating the high heat generated when a lighting system uses LEDs in close proximity with each other.

In U.S. Pat. No. 5,857,767 entitled "Thermal Management System for LED Arrays," the inventor discloses a method of manufacturing an electrically-driven LED lamp including the step of screen printing an electrically insulating coating over an electrically and thermally conductive heat sink. A printing circuit with traces of a resin with a metal disbursed therein is made to establish discreet and electrically conductive paths for electrical interconnecting LEDs. This disclosed system is intended for use in tail lights of a vehicle. However, this system does not address the needs of a replaceable, movable, and durable lighting system for use to light the interior cabin of vehicles.

Therefore, any advancement in the field of an LED lighting device and system which would improve the heat dissipation, replaceability, movability and durability of the LED lighting device and system would be advantageous.

SUMMARY OF THE INVENTION

A lighting device and system for illuminating the interior of a vehicle, aircraft or building is provided. The lighting device and system includes a channel case made from a thermally conductive material, including aluminum. The channel case has a bottom edge and two opposed side edges forming an interior space. A circuit board is disposed within the interior space of the channel case and the circuit board includes circuit traces on the top, bottom or both sides of the circuit board. A heat transfer device is attached to the bottom of the circuit board and is further attached to the bottom of the channel case. The heat transfer device allows for the heat generated by the LEDs to be transferred to the channel case which acts as a heat sink. A plurality of light-emitting diodes and resistors are mounted on the circuit board in series and generate light through a lens which is attached to the two opposed side edges of the channel case.

A BRIEF DESCRIPTION OF THE DRAWINGS

A better understanding of the present invention can be obtained when the following detailed description of one exemplary embodiment is consider in conjunction with the following drawings, in which:

FIG. 1 is a view of the cross-section of an airplane fuselage including the LED lighting system according to the present invention;

FIG. 2 is an additional view of the cross-sectional view of FIG. 1;

DETAILED DESCRIPTION OF EXEMPLARY EMBODIMENTS

Figure 3:
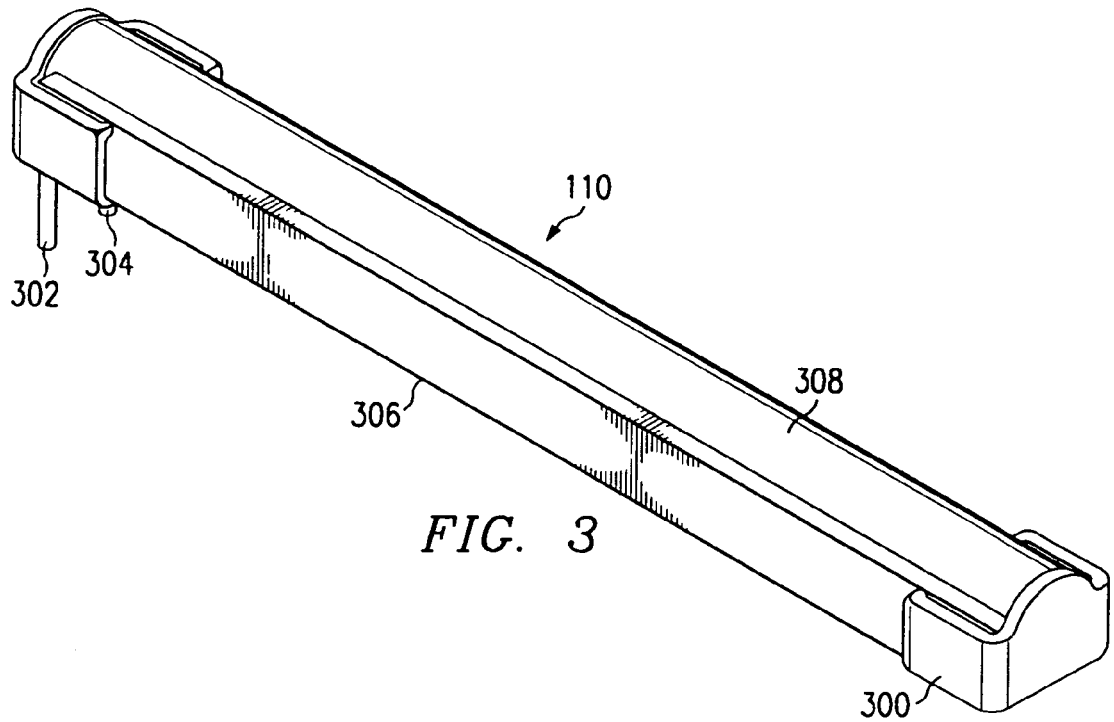
FIG. 3 is a diagram illustrating the LED lighting device according to the present invention.

In the description that follows, like parts are marked throughout the specification and drawings with the same reference numerals, respectively. The drawing figures are not necessarily drawn to scale and certain figures may be shown in an exaggerated or generalized form in interest of clarity and conciseness.

FIGS. 1 and 2 illustrate a cross-sectional view of the cabin of an airplane including the LED lighting system according to the present invention. The aircraft fuselage 100 is shown. The aircraft fuselage 100 includes an aircraft cabin 101. The aircraft cabin 101 is defined by an artificial ceiling 103 and an artificial floor 102. Seats 104 are attached to the artificial floor 102. A lighting and duct panel 106 is provided above seats 104. A duct 108 is shown attached to the aircraft fuselage 100 and is positioned behind the lighting and duct panel 106. The lighting and duct panel 106, the duct 108 and the aircraft fuselage 100 form a cavity 107. Within cavity 107, the LED lighting system 111 is shown. The LED lighting system 111 is oriented such that the light produced from the LEDs is directed through the opening provided between duct 108, lighting and duct panel 106 and the fuselage 100. In one embodiment, the LED lighting system 111 provides indirect light to the cabin 101 of the aircraft. However, in another embodiment, the LED lighting system 111 can provide direct light to the cabin 101. The LED lighting system 111 is not limited to use in an aircraft, but can be implemented in a wide variety of settings, including but not limited to, building, vehicles, trains and buses. The LED lighting system 111 can be mounted to the light and duct panel 106, to the duct 108, or to the fuselage 100.

Figure 4:
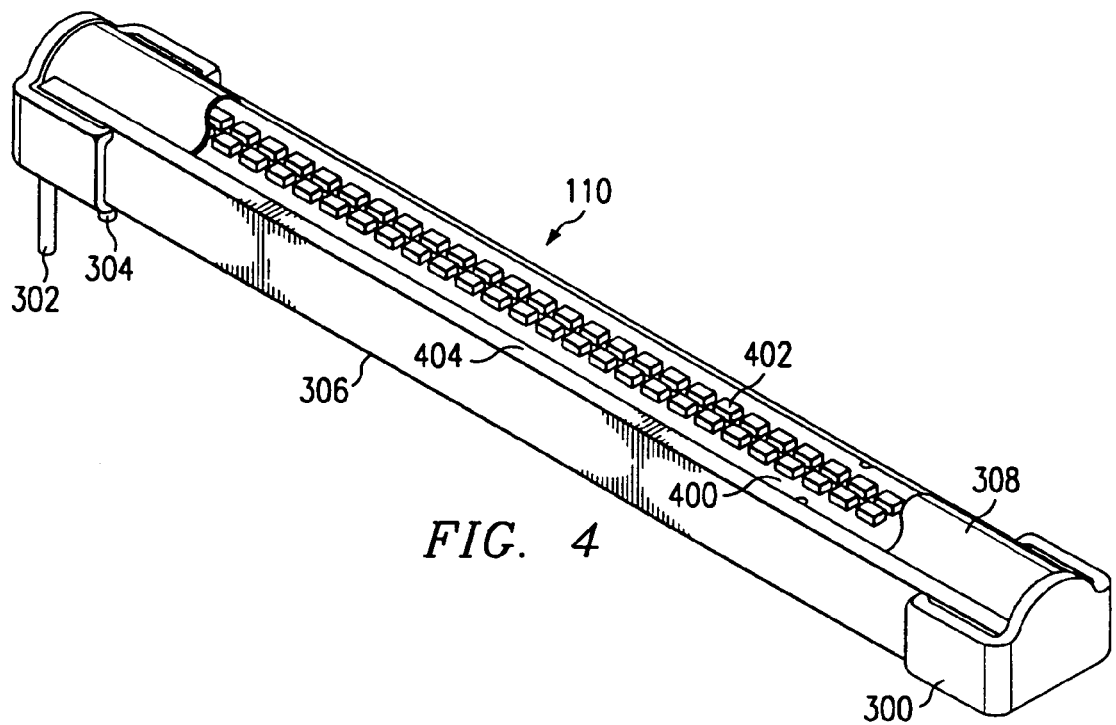
FIG. 4 is a diagram illustrating the LED lighting device with the lens covering cut away according to the present invention.

FIGS. 3 and 4 illustrate the LED lighting device according to the present invention. The LED lighting device 110 is shown. An end cap 300 is shown attached to each end of the LED lighting device 110. The end cap 300 in one embodiment snaps on to the channel case 306 and the lens 308, however, a wide array of attachment configurations may be implemented without detracting from the spirit of the invention. The end cap 300 is preferably made of a durable plastic or metallic material and can be manufactured to fasten to other LED lighting system end caps 300. The end cap 300 allows power lines 302 and 304 to enter and exit the LED lighting device 110. In another embodiment, electrical connectors protruding from one end cap 300 can attach to another end cap 300 electrically connecting the two LED lighting systems 111. Further, the end caps 300 can provide integral strain to the electrical connectors of the LED lighting systems 111. In another embodiment, the electrical connectors can be rigid or hard mounted and attach to other electrical connectors to form a solid connection.

The channel case 306 is preferably made of aluminum, however, a wide variety of materials may be used without detracting from the spirit of the invention, including but not limited to, metals and any heat conductive material. The channel case 306 is formed with a bottom and two opposing sides. The channel case 306 is an elongated box forming an interior space. The channel case 306 can also include integral mounting grooves for the lens 308 and for a circuit board 400. The lens 308 is shown engaged with the channel case 306. The lens 308 engages the opposed sides of the channel case 306 or the lens 308 can engage the channel case lip 504 of the opposed sides of the channel case 306, which can be seen in FIG. 5. The lens 308 is a transparent plastic such as Lexan, or other plastics, or the lens 308 may be an optical filter permitting only certain colors of light to pass through the lens 308. The lens 308 can be bent to form an arc or the lens 308 can be manufactured with an arc. The edges of the lens 308 engage the sides of the channel case 306, enclosing the channel case 306.

Power lines 302 and 304 are configured for ground and 28 volt. The LED lighting device 110 runs on a 28 volt system which can be powered from the aircraft, vehicle or building in which the LED lighting device 110 is installed. In another embodiment, the LED lighting device 110 is attached to a separate power supply or is attached to a regulator which is attached to the aircraft, vehicle or building. In one embodiment, the power regulator is capable of pulse width modulation and is capable of using a low electromagnetic interference wave form. In another embodiment, a feedback circuit may be coupled to the power regulator. The feedback circuit would modify that amount of power distributed by the power regulator to the LED lighting device 110. The feedback circuit could include a temperature gauge and circuitry to assist in the modification of the amount of power distributed. Thus, as temperatures increase, the regulator would reduce the amount of power distributed to the LED lighting device 110, thereby maintaining a desirable temperature.

Figure 9:
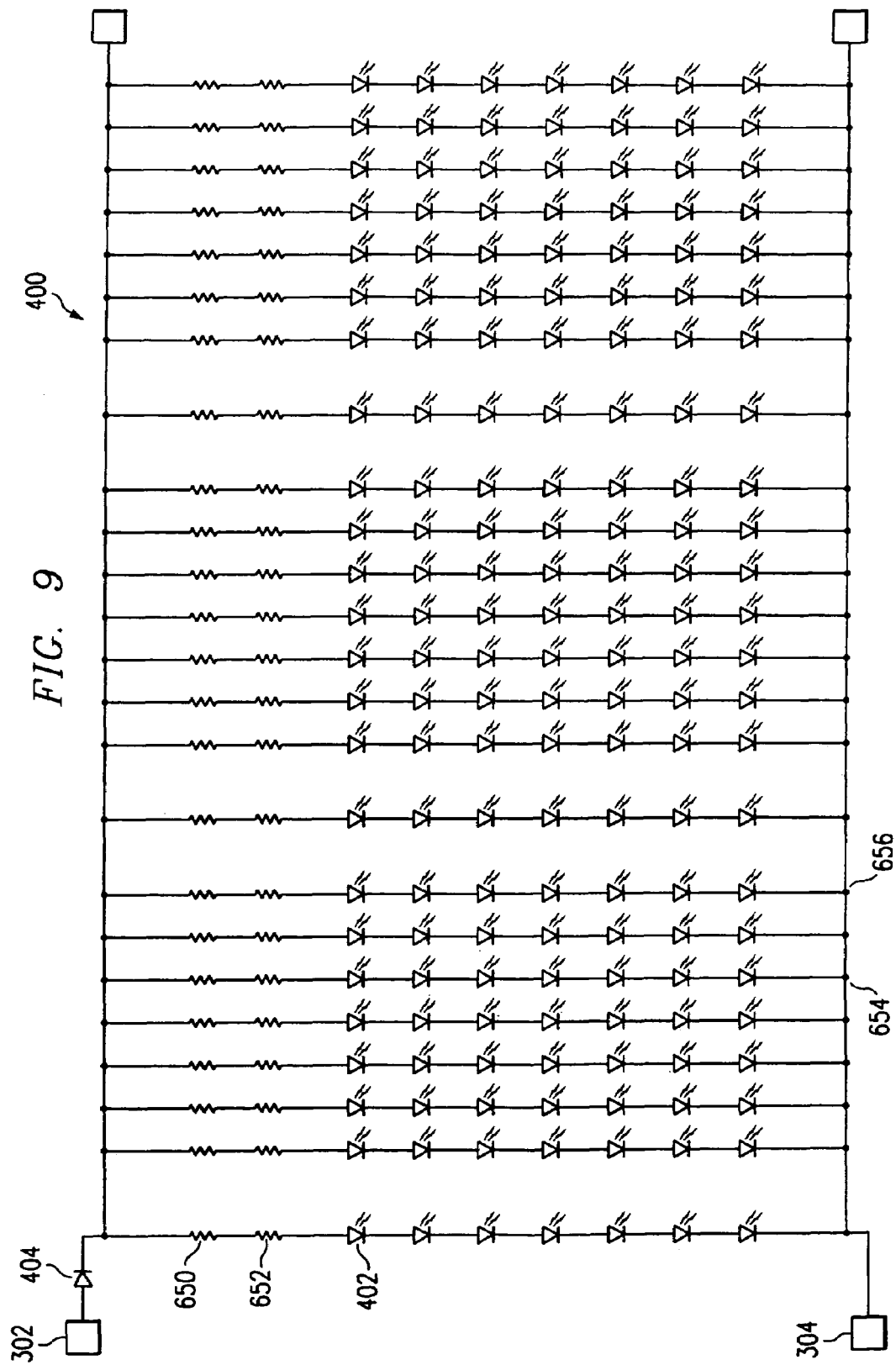
FIG. 9 is a schematic diagram of the LED lighting device according to the present invention.

A circuit board 400 is shown disposed within the interior space formed by the channel case 306 and the lens 308. The circuit board 400 can be manufactured using a standard printed wiring board (PWB) or using a standard printed circuit board (PCB). Either board provides for the mounting of electrical components including the LEDs 402, diodes 404 and resistors 650 and 652 (as shown in FIG. 9). The circuit board 400 typically consists of a non-conductive substrate upon which a conductive pattern or circuitry is formed. This conductive pattern of circuitry can be placed on either the top, bottom, on both sides or upon multiple internal layers of the circuit board 400. The circuit board 400 can either be a rigid circuit board or a flexible circuit board. The LEDs 402, diodes 404 and resistors 650 and 652 are electrically connected to the circuit traces on the circuit board 400. The circuit traces of the circuit board 400 are further connected to the power lines 302 and 304.

The diodes 404 are mounted to the circuit board 400 and provide voltage reversal protection to the LED lighting device 110. Voltage reversal occurs when the power lines 302 and 304 are reversed resulting, in the ground line being attached to the 28 volt power supply and the 28 volt power line attached to the ground. Voltage reversal damages the LEDs 402 and can render the LED lighting device 110 unworkable.

The LEDs 402 are mounted to the circuit board 400 and include white LEDs 402 manufactured by OSRAM, a division of Siemens. However, a wide variety of LEDs, colors and manufacturers can be implemented without detracting from the spirit of the invention. The LEDs 402 can be surface mounted to the circuit board 400 or the LEDs 402 can be hole mounted through the circuit board 400. The LEDs 402 as shown in one embodiment are two LEDs, spaced apart, distributed down the center of the channel case 306. The LEDs 402 of the LED lighting device 110 can be coupled into groupings within one single LED lighting system 111. The LEDs 402 of a single grouping can be interspersed within other groupings of LEDs 402 of the LED lighting device 110. If one group of LEDs 402 ceases to function, the overall output of light from the LED lighting device 110 is only slightly diminished and does not cause a block of darkness in the LED lighting device 110.

Figure 5:
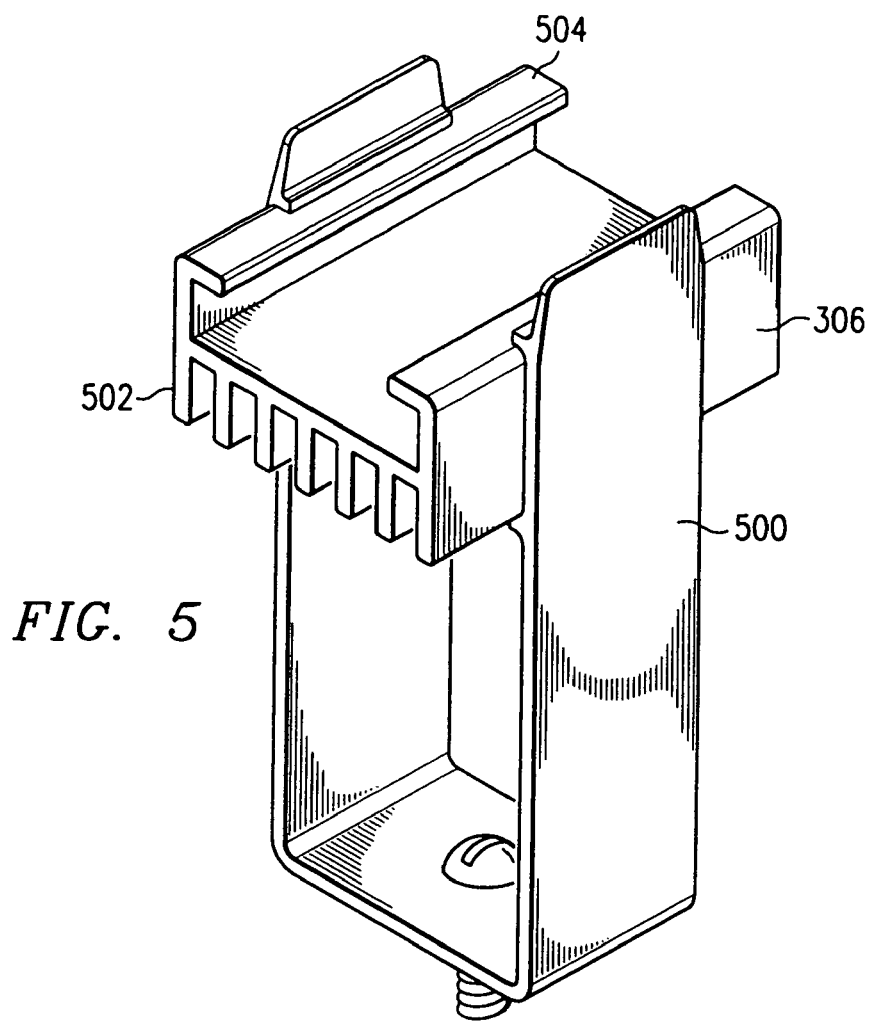
FIG. 5 is a diagram depicting the channel case of the LED lighting device secured by the LED mounting bracket.

Next, in FIG. 5, a mounting bracket for an LED lighting system is shown. A mounting bracket 500 is shown attached to the channel case 306 of the LED lighting device 110. The mounting bracket 500, in one embodiment, snaps onto the outer edge of the channel case 306 and then is screwed or bolted into the interior of the cabin in which the LED lighting device 110 is installed. Heat sink fins 502 are shown on the channel case 306. The heat sink fins 502 provide additional heat dissipation capability for the channel case 306. The channel case 306 functions as a heat dissipation device with or without the heat sink fins 502. A channel case lip 504 is shown as part of channel case 306. The channel case lip 504 extends perpendicular to the opposed sides of the channel case 306. The lens 308, when attached to LED lighting device 110 contacts with the lip 504 of the channel case 306.

Figure 6:
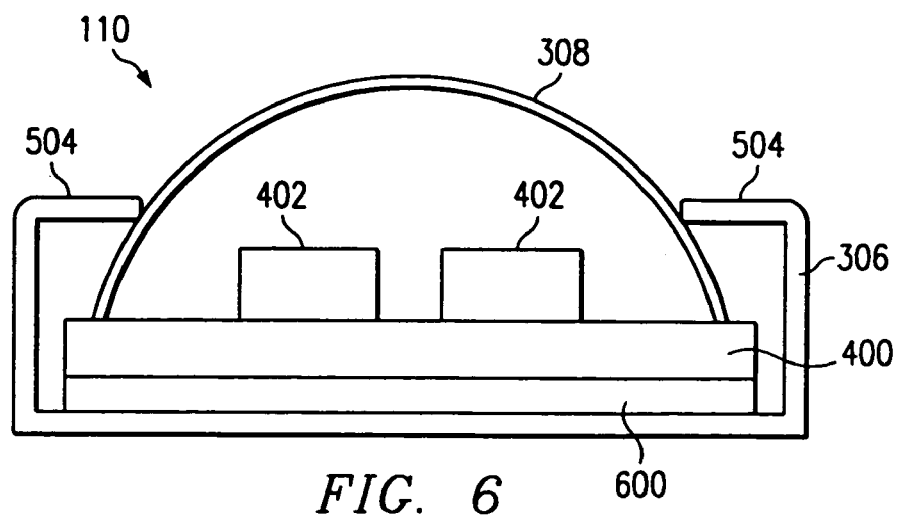
FIG. 6 is an end view of the cross-section of the LED lighting device according to the present invention.

FIG. 6 illustrates an end view of the LED lighting device 110. LED lighting device 110 is shown including the lens 308, the channel case 306 and two LEDs 402 mounted on the circuit board 400. The circuit board 400 is attached to a thermally conductive layer 600. The thermally conductive layer 600 is either fixedly or adhesively attached to the circuit board and is in contact with the channel case 306. Alternatively, in another embodiment, the thermally adhesive layer 600 can be removably attached to the circuit board 400 or the thermally adhesive layer 600 can be an element of the circuit board 400. Further, the thermally adhesive layer 600 can be fixedly or removably attached to the channel case 306. The lens 308, in one embodiment, applies a downward force on the circuit board 400 which compresses the thermally conductive layer 600 against the channel case 306. The downward force is from the lens 308 attempting to straighten the arc and from the force applied to the channel case lip 504 by the lens 308. The thermally conductive layer 600 when in contact with the channel case 306 transmits the heat generated from LEDs 402 and the circuit board 400 to the channel case 306 which acts as a heat sink. In one embodiment, the thermally conductive layer 600 is manufactured from Chotherm; however, a wide variety of materials may be used as a thermally conductive layer without detracting from the spirit of the invention.

By transmitting the heat from the LEDs 402 to the channel case 306, the overall temperature of the LED lighting device 110 is reduced. The internal heat produced by the LED lighting system of the prior art system identified in U.S. Pat. No. 6,158,882, issued to Bischoff, exceeds 80 degrees Celsius. LEDs 402 are manufactured to last in excess of 100,000 hours of use. However, when the surrounding air temperature of the LEDs 402 exceeds 40 degrees Celsius, the LEDs 402 begin to degrade and their usable lifetime is reduced. Temperatures in excess of 70 to 80 degrees Celsius greatly reduce the usefulness of the LEDs 402 and cause the LEDs 402 to cease functioning in a very short period of time.

Figure 7:
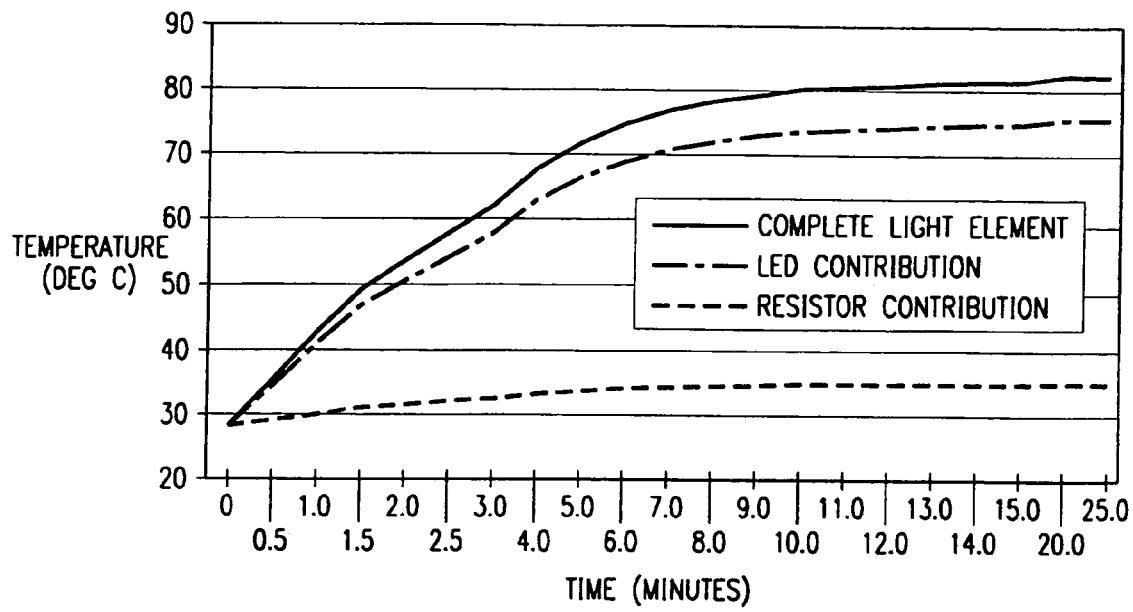
FIG. 7 is a temperature diagram of an LED lighting system according to the prior art.
Figure 8:
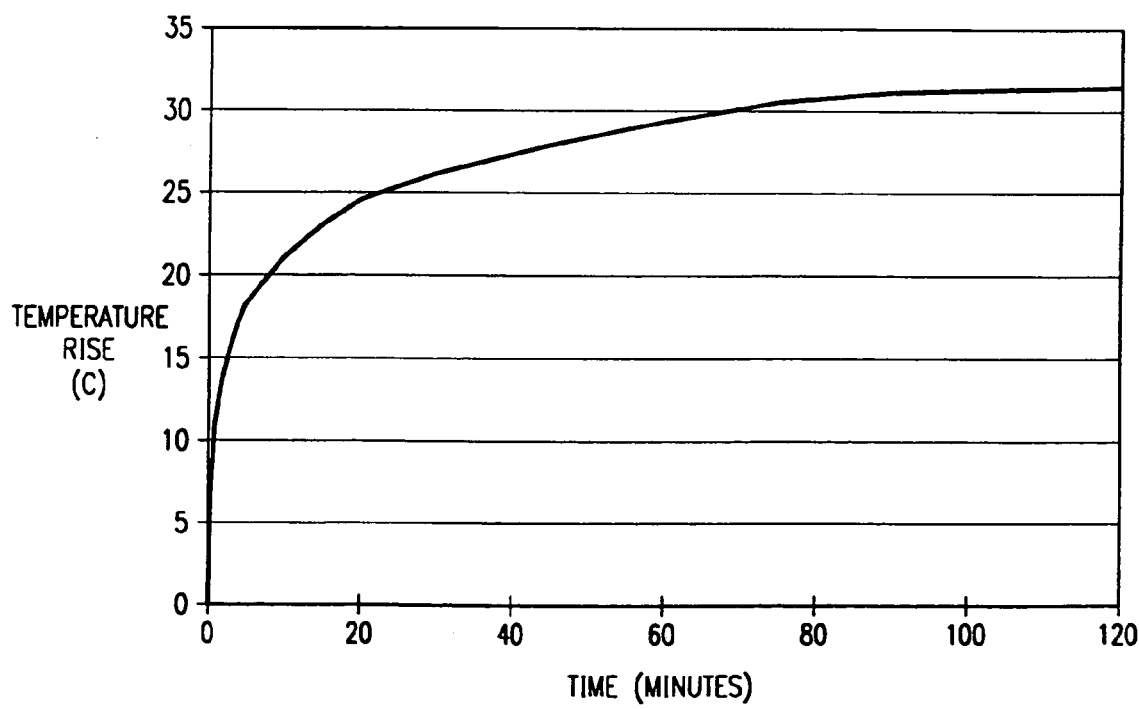
FIG. 8 is a temperature diagram of the LED lighting system according to the present invention.

As can be seen in FIG. 7, the internal temperature of an enclosed LED lighting system, like the system disclosed by Bischoff, is capable of reaching temperatures in excess of 80 degrees Celsius over the ambient temperature within 10 to 12 minutes. Comparatively, the LED lighting system 111, according to the present invention, only reaches temperatures of approximately 31 degrees Celsius over the ambient temperature after use for several hours as is shown in FIG. 8. FIG. 8 further shows that the LED lighting system 111 reaches a temperature of approximately 25 degrees Celsius over the ambient temperature within the first 20 minutes of use, leveling off to approximately 31 degrees Celsius over the ambient temperature over an extended period of time. This reduction of internal temperature greatly enhances the reliability and durability of the LEDs 402, thus decreasing the replacement cost of the LED lighting system 111 while increasing the reliability of their use. The channel case 306, with or without the heat sink fins 502, provides for heat dissipation of the LEDs 402 without damaging the LED 402.

The channel case 306 of the LED lighting system 111 only reaches an external temperature of approximately 30-31 degrees Celsius over the ambient temperature. At this temperature, the channel case 306 of the LED lighting system 111 can be mounted against any surface, whether metallic or plastic, without causing damage due to excessive heat.

FIG. 9 illustrates a schematic diagram of the electronic system of the circuit board 400 of the present invention. The schematic diagram of circuit board 400 is shown. The circuit board 400 includes power lines 302 and 304 providing ground and 28 volt power to the circuit traces of board 400. The 28 volt power line 302 is connected to a reverse voltage diode or rectifier 404. The reverse voltage diode or rectifier 404 protects the circuit board 400 if the power lines 302 and 304 are incorrectly installed and are connected to reverse poles.

Resistors 650 and 652 are connected to the circuit traces along with the LEDs 402. Resistors 650 and 652 are current limiting resistors. As can be seen, the LEDs 402 are connected in serial on certain circuit trace lines and are connected in parallel with other groupings of circuit trace lines. LED grouping 654 is connected in parallel with LED grouping 656. As has been discussed previously, the LEDs 402 of any particular grouping, such as LED grouping 654, can be interspersed throughout the LED lighting system 111. Therefore, if any particular LED grouping, such as grouping 654 becomes unworkable, then the non-functioning LEDs 402 of the LED lighting device 110 will be interspersed throughout the entire LED lighting device 110 and not contained within a block of LEDs 402.

Figure 10:
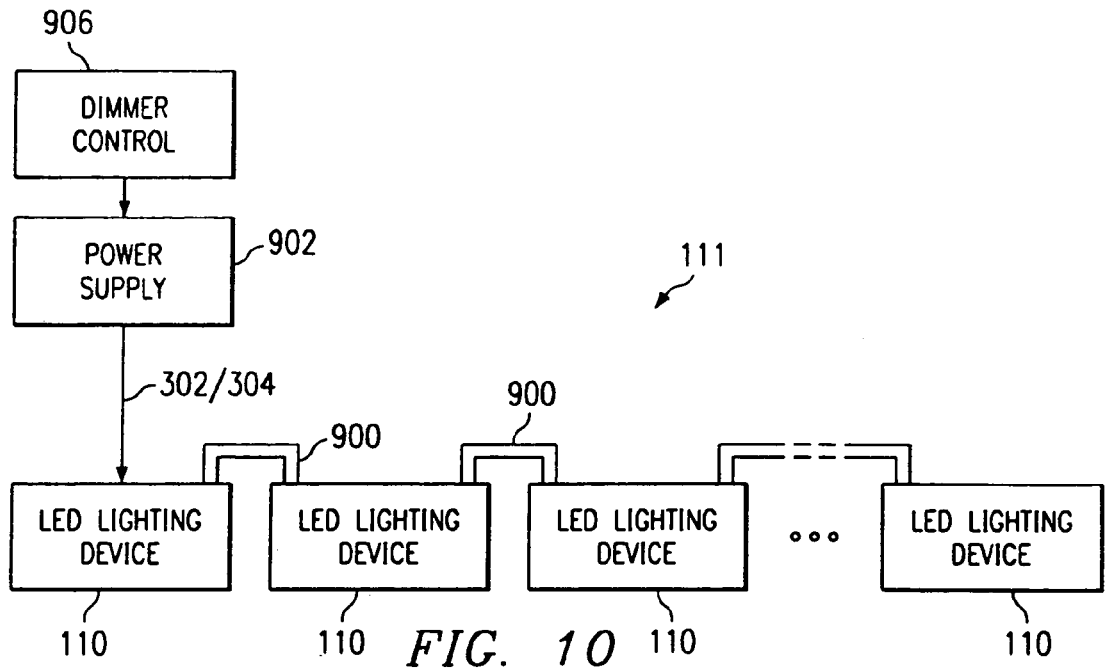
FIG. 10 is a block diagram of a LED lighting system.

FIG. 10 illustrates an LED lighting system including multiple LED lighting devices connected in series. Multiple LED lighting devices 110 are daisy-chained together to form an LED lighting system 111. A first LED lighting device 110 can be connected to another LED lighting device 110 through an electrical connection 900. The electrical connection 900 connects the circuit board traces of one LED lighting device 110 with another LED lighting device 110. Therefore, when the first LED lighting device 110 is connected to a power supply 902 through power lines 302 and 304, all LED lighting devices 110 which are connected in series through the daisy-chain connections 900 are powered from a single power supply 902. The single power supply 902 is also connected to a dimmer control 906. The dimmer control allows for the increase or decrease of power to be sent from the power supply 902 to the LED lighting devices 110.

Figure 11:
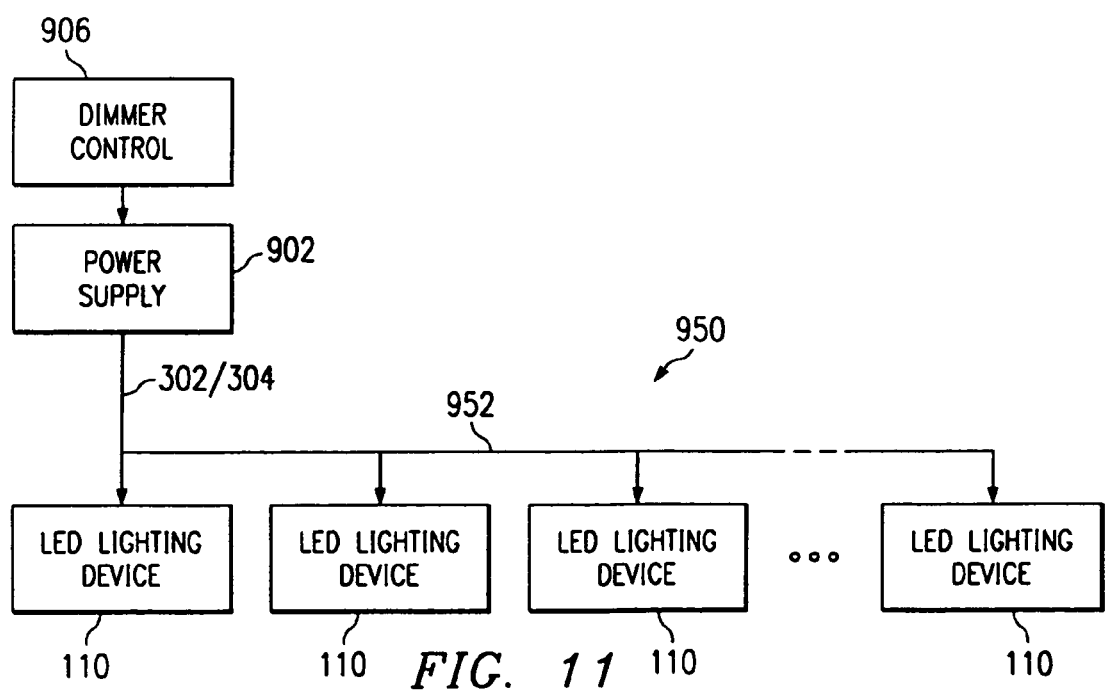
FIG. 11 is a block diagram of a LED lighting system connected in parallel.

FIG. 11 illustrates an LED lighting system including multiple LED lighting devices connected in parallel. In this embodiment, the LED lighting devices 110 can be connected in parallel to form a parallel LED lighting system 950. Each LED lighting device 110 is connected the other LED lighting devices 110 and to the power supply 902 through a common electrical connection 952. The common electrical connection 952 connects the circuit board traces of one LED lighting device 110 with each of the other LED lighting devices 110. Therefore, each LED lighting device 110 is connected to the power supply 902 through power lines 302 and 304 and is connected to each other LED lighting devices 110 in parallel. The single power supply 902 is also connected to a dimmer control 906. The dimmer control allows for the increase or decrease of power to be sent from the power supply 902 to the LED lighting devices 110.

The LED lighting device 110, the LED lighting system 111 or the parallel LED lighting system 950 can be attached to the aircraft, vehicle or building. Each LED lighting device 110 can be screw mounted, bolted or adhesively attached to the interior surface of the cabin of the aircraft, building or vehicle. Further, each LED lighting device 110 can snap-on to the mounting bracket 500 which can be screw mounted, bolted or adhesively attached to the interior surface of the cabin of the aircraft, building or vehicle. Through the use of the daisy-chain electrical connections 900 or through the common electrical connection 952, individual LED lighting devices 110 can be replaced in the LED lighting system 111 and the parallel LED lighting system 950 without replacement of the entire system. Further, by using the pigtailed electrical connections 900 and the pigtailed common electrical connections 952, movement of the building, vehicle or aircraft will not cause damage to the LED lighting devices 110 as the LED lighting device 110 can move independent of the other LED lighting devices 110 in either LED lighting system 111 and 950. Thus, the expansion and contraction of the vehicle, building or aircraft will not damage the LED lighting system 111 or the parallel LED lighting system 950. Through the use of a single power supply 902, the LED lighting device 110, the LED lighting system 111 and the LED lighting system 950 produce a minimal amount of electromagnetic interference. Further, the rugged construction and design of the LED lighting system 111 and the LED lighting system 950 provide for enhanced durability.

The foregoing disclosing the description of the invention are illustrative and explanatory thereof and various changes to size, shape, material, components, and order may be without departing from the spirit of the invention.

What is claimed is:

1. A lighting device for illuminating the interior of a vehicle, aircraft or building, the lighting device comprising:
   a channel case made from a thermally conductive material, the channel case comprising:
      a bottom edge; and
      two opposed side edges;
      wherein the bottom edge and the two opposed side edges form an elongated box further forming an interior space;
   at least one circuit board disposed within the interior space of the channel case, wherein the at least one circuit board includes top and bottom sides and includes circuit traces;
   a heat transfer device coupled to the at least one circuit board and the bottom edge of the channel case, the heat transfer device transferring heat to the channel case;
   a plurality of light emitting diodes (LEDs) mounted on the at least one circuit board and electrically connected to the circuit traces;
   a plurality of resistors mounted on the at least one circuit board and electrically connected to the circuit traces;
   a lens attached to the two opposed side edges of the channel case; and
   wherein the transferred heat is dissipated through the channel case which is beside and behind the lens.

2. The lighting device of claim 1 wherein the lens is an arc enclosing the channel case.

3. The lighting device of claim 1 wherein the heat transfer device is fixedly attached to the at least one circuit board.

4. The lighting device of claim 1 wherein the heat transfer device is adhesively attached to the at least one circuit board.

5. The lighting device of claim 1 wherein the heat transfer device is removably attached to the channel case.

6. The lighting device of claim 1 wherein the resistors limit the current to the LEDs.

7. The lighting device of claim 1 wherein the channel case includes a channel case with heat sink fins.

8. The lighting device of claim 1 further comprising an electrical power device coupled to the circuit traces.

9. The lighting device of claim 8 wherein the electrical power device includes a power regulator capable of pulse width modulation.

10. The lighting device of claim 9 wherein the power regulator is capable of using a low electromagnetic interference waveform.

11. The lighting device of claim 8 wherein the electrical power device is coupled to the vehicle, aircraft or building.

12. The lighting device of claim 1 wherein the heat transfer device is Chotherm.

13. The lighting device of claim 1 wherein the lens is transparent.

14. The lighting device of claim 1 wherein the lens is plastic.

15. The lighting device of claim 14 wherein the plastic lens is Lexan.

16. The lighting device of claim 1 wherein the LEDs are white light LEDs.

17. The lighting device of claim 1 wherein the plurality of LEDs include groups of spatially interspersed LEDs.

18. The lighting device of claim 1 wherein the channel case is an aluminum channel case.

19. The lighting device of claim 1 wherein the at least one circuit board includes at least one flexible circuit board.

20. The lighting device of claim 1 wherein the lens includes an optical filter.

21. The lighting device of claim 1 wherein the LEDs are surface mounted to the at least one circuit board.

22. The lighting device of claim 1 wherein the LEDs are through hole mounted to the at least one circuit board.

23. The lighting device of claim 1 further comprising a feedback circuit coupled to the power regulator.

24. The lighting device of claim 23, wherein the feedback circuit includes a temperature gauge.

25. The lighting device of claim 23, wherein the feedback circuit modifies the amount of power distributed by the power regulator.

26. The lighting device of claim 1 further comprising reverse voltage diodes coupled to the circuit traces.

27. The lighting device of claim 1 further comprising an end cap attached to an end of the channel case.

28. The lighting device of claim 27 wherein end caps are attached to both ends of the channel case.

29. The lighting device of claim 27 wherein the end cap utilizes a snap-on attachment means to attach to the end of the channel case.

30. The lighting device of claim 1 wherein the channel case includes integral mounting grooves.

31. A lighting system for illuminating the interior of a vehicle, aircraft or building, the lighting system comprising:
   a plurality of lighting devices, the lighting devices comprising:
      a channel case made from a thermally conductive material, the channel case comprising:
         a bottom edge; and
         two opposed side edges;
         wherein the bottom edge and the two opposed side edges form an elongated box further forming an interior space;
      at least one circuit board disposed within the interior space of the channel case, wherein the at least one circuit board includes top and bottom sides and includes circuit traces;
      a heat transfer device coupled to the at least one circuit board and the bottom of the channel case, the heat transfer device transferring heat to the channel case;

a plurality of light emitting diodes (LEDs) mounted on the at least one circuit board and electrically connected to the circuit traces;

a plurality of resistors mounted on the at least one circuit board and electrically connected to the circuit traces;

a lens attached to the two opposed side edges of the channel case;

end caps attached to both ends of the channel case; and wherein the transferred heat is dissipated through the channel case which is beside and behind the lens;

electrical connectors coupled to the circuit traces of each lighting device, the electrical connectors of the plurality of lighting devices fastening to the other electrical connectors of the plurality of lighting devices.

32. The lighting system of claim 31 wherein, for each lighting device of the plurality of lighting devices, the lens is an arc enclosing the channel case.

33. The lighting system of claim 31 farther comprising an electrical power device coupled to a single electrical connection of the plurality of lighting devices; wherein the plurality of lighting devices are daisy-chained together and powered from the single electrical power device.

34. The lighting system of claim 33 wherein the electrical power device includes a power regulator capable of pulse width modulation.

35. The lighting system of claim 33 wherein the electrical power device is coupled to the vehicle, aircraft or building.

36. The lighting system of claim 31 wherein the electrical connectors protrude from end caps.

37. The lighting system of claim 31 wherein the end caps provide integral strain relief for the electrical connectors.

38. The lighting system of claim 31 wherein the plurality of lighting devices are mounted to the vehicle, aircraft or building.

39. The lighting system of claim 31 wherein the plurality of lighting devices are screw mounted to the vehicle, aircraft or building.

40. The lighting system of claim 31 wherein the plurality of lighting devices snap on to a mounting bracket attached to the vehicle, aircraft or building.

41. The lighting system of claim 31 wherein the circuit traces of the at least one circuit board are located upon multiple internal layers of the circuit board.

42. The lighting system of claim 31 wherein the circuit traces of the at least one circuit board are located upon the top side of the circuit board.

43. The lighting system of claim 31 wherein the circuit traces of the at least one circuit board are located upon both the top and bottom sides of the circuit board.

44. The lighting system of claim 31 wherein the circuit traces of the at least one circuit board are located upon the bottom sides of the circuit board.

45. The lighting system of claim 31 further comprising: an electrical power device coupled to the plurality of lighting devices; wherein the plurality of lighting devices are connected in parallel and are powered from the single electrical power device.

46. The lighting system of claim 31 wherein the electrical connectors include hard mounted electrical connectors, the hard mounted electrical connectors rigidly attaching to other hard mounted connectors.

47. The lighting system of claim 31 wherein the electrical connectors include pigtailed electrical connectors, the pigtailed electrical connectors for providing expansion and contraction of the lighting devices without unfastening.

* * * * *